(12) United States Patent
Macallister

(10) Patent No.: US 12,503,005 B2
(45) Date of Patent: Dec. 23, 2025

(54) SPLIT-LOAD ELECTRIC VEHICLE CHASSIS AND DOUBLE FRONT BATTERY LIFT SYSTEM FOR RAPID BATTERY EXCHANGE

(71) Applicant: Donald Ian Macallister, Newport Coast, CA (US)

(72) Inventor: Donald Ian Macallister, Newport Coast, CA (US)

( * ) Notice: Subject to any disclaimer, the term of this patent is extended or adjusted under 35 U.S.C. 154(b) by 238 days.

(21) Appl. No.: 18/236,027

(22) Filed: Aug. 21, 2023

(65) Prior Publication Data

US 2025/0065769 A1    Feb. 27, 2025

(51) Int. Cl.

| | |
|---|---|
| *B60L 53/80* | (2019.01) |
| *B60L 50/60* | (2019.01) |
| *B62D 21/02* | (2006.01) |
| *B65G 1/06* | (2006.01) |
| *H01M 50/244* | (2021.01) |
| *H01M 50/249* | (2021.01) |

(52) U.S. Cl.
CPC .............. *B60L 53/80* (2019.02); *B60L 50/66* (2019.02); *B62D 21/02* (2013.01); *B65G 1/06* (2013.01); *H01M 50/244* (2021.01); *H01M 50/249* (2021.01); *H01M 2220/20* (2013.01)

(58) Field of Classification Search
CPC .......... B60L 53/80; B60L 53/50; B60L 50/66; B62D 21/02; H01M 50/244; H01M 50/249
See application file for complete search history.

(56) References Cited

U.S. PATENT DOCUMENTS

| | | | | |
|---|---|---|---|---|
| 4,342,533 A | * | 8/1982 | Hane ...................... | B60L 50/66 |
| | | | | 414/400 |
| 5,508,597 A | * | 4/1996 | Parmley, Sr. ........... | B60L 50/66 |
| | | | | 414/281 |
| 5,612,606 A | * | 3/1997 | Guimarin ............ | H01M 50/204 |
| | | | | 414/281 |

(Continued)

FOREIGN PATENT DOCUMENTS

JP      2004262632 A  *  9/2004  .............. B60L 50/66

OTHER PUBLICATIONS

Nakamoto (Year: 2004).*

*Primary Examiner* — George C Jin

(57) ABSTRACT

The present invention introduces an innovative split-load electric vehicle chassis, specifically designed with bifurcated load-bearing beams, facilitating a swift horizontal insertion and extraction of planar battery containers directly through the vehicle's center of gravity. This design distinguishes itself from traditional solid longitudinal chassis-frames, optimizing battery container positioning. Working in tandem with the chassis, the invention incorporates a double front battery lift system, capable of holding two battery containers concurrently. This lift is equipped with sprocket powered rollers and can execute vertical movements, harmonizing with the vehicle's chamber rollers. The battery exchange process, with this integrated design, demands a mere three movements, completing a full battery swap in under 5 seconds. Mounted to a charging tower, the lift efficiently manages the deposition and acquisition of batteries, readying itself for successive exchanges. This system showcases the potential for large-scale battery-swapping networks, particularly beneficial for SUV-pickup vehicles.

15 Claims, 8 Drawing Sheets

(56) References Cited

U.S. PATENT DOCUMENTS

| | | | |
|---|---|---|---|
| 5,760,569 A * | 6/1998 | Chase, Jr. | H01M 50/204 |
| | | | 414/281 |
| 5,998,963 A * | 12/1999 | Aarseth | B60L 50/64 |
| | | | 320/109 |
| 6,631,775 B1 * | 10/2003 | Chaney | B60L 53/80 |
| | | | 280/783 |
| 8,672,354 B2 * | 3/2014 | Kim | B62D 21/10 |
| | | | 280/783 |
| 9,358,895 B2 * | 6/2016 | Avganim | B60K 1/04 |
| 2009/0198372 A1 * | 8/2009 | Hammerslag | G07F 15/005 |
| | | | 700/226 |

* cited by examiner

SPLIT-LOAD ELECTRIC VEHICLE CHASSIS AND DOUBLE FRONT BATTERY LIFT SYSTEM FOR RAPID BATTERY EXCHANGE

FIELD OF INVENTION

The present invention relates generally to electric vehicle infrastructure, focusing on a novel chassis design and dual-shelf battery lift mechanism for rapid battery swaps.

BACKGROUND

Electric vehicles (EVs) have witnessed rapid adoption globally, driven by the promise of a cleaner, more sustainable mode of transportation. As their prevalence grows, the imperative to address their key limitation—battery recharging times—becomes more pronounced. Historically, electric vehicles have been tethered by the extended durations required for recharging their batteries. A typical full recharge process necessitates intervals ranging between 30 to 60 minutes, often longer. This considerable duration, in stark contrast to the quick refueling times of traditional combustion engine vehicles, serves as a notable hindrance to the broader acceptance and utility of EVs, especially in scenarios requiring swift turnarounds.

The industry, recognizing this bottleneck, embarked on an alternative approach: battery swapping mechanisms. These systems aimed to exchange a depleted battery for a fully charged one, effectively eliminating the traditional waiting period associated with recharging. However, existing battery swap designs have not been without their own challenges. Many of these mechanisms involve intricate sequences of more than twelve movements, culminating in a swap time around 5 minutes. While this is a marked improvement over standard recharging times, it still falls short of the instantaneous refueling experiences provided by traditional gas stations.

Further exacerbating the situation, conventional battery swapping systems often necessitate that the batteries be placed into added-on boxes located on the undersides of vehicles. This approach not only introduces additional structural and mechanical complexities but also potentially affects the vehicle's center of gravity and overall performance. Such battery placement methodologies often diverge from the vehicle's primary load-bearing beams, creating potential vulnerabilities in the overall structural integrity of the vehicle, especially considering the significant weight of the battery containers.

Amidst this backdrop, the driving factors for innovation become clear. There exists an unmet need for a system that merges the rapidity of conventional fueling with the environmental advantages of electric vehicles. Such a system would not only require a revolutionary reconsideration of the vehicle's very architecture but also a rethinking of the battery swapping mechanism itself, all while safeguarding the vehicle's structural integrity.

With these challenges in perspective, the present invention was conceived and developed to introduce a paradigm shift in the electric vehicle recharging landscape. Through a unique blend of innovative design and mechanical efficiency, it endeavors to overcome the intrinsic limitations of both traditional recharging and existing battery swapping methods, paving the way for a new era of electric vehicle utility and convenience.

It is within this context that the present invention is provided.

SUMMARY

The present invention provides a novel approach to electric vehicle (EV) battery replacement, aiming to substantially reduce recharging time while simplifying the battery swapping process. Central to this invention is a modified "split load" electric vehicle chassis with bifurcated load-bearing beams and a uniquely designed battery reloading system. Together, these components allow for swift and streamlined battery exchanges in a matter of seconds, redefining the convenience and efficiency of EV usage.

In some embodiments, the invention introduces a refined EV chassis featuring bifurcated upper and lower longitudinal beams in its middle section. This design departure from traditional solid end-to-end beams permits a battery container to be directly inserted into and out of the vehicle's center of gravity in one fluid horizontal movement. By facilitating such direct loading through the main load-bearing beams, the invention ensures optimal structural integrity, given the significant weight of the battery containers.

In some embodiments, the invention incorporates a double front battery lift, structured to support two battery containers simultaneously, each on separate shelves equipped with sprocket powered rollers. This lift, through a controlled sequence of vertical movements, enables the swift exchange of a spent battery with a fully charged one. This unique mechanism ensures that battery swaps are executed in a mere three movements, making it possible to complete the process in under five seconds.

In some embodiments, the loading and unloading of battery containers occur via heavy-duty chain and sprocket-powered rollers. These robust mechanisms ensure the smooth and efficient movement of battery containers, which can be as sizable as 6 foot long, 5 feet wide, and 7 inches tall, and weigh up to 2000 pounds when combined with the battery.

In some embodiments, a double front battery swap lift is mounted to a tower, equipped with multiple shelves each with their own roller mechanisms. Each of these shelves can house pre-charged battery containers. After a swap, the lift can efficiently deposit a spent battery onto an empty shelf for recharging while simultaneously acquiring a freshly charged battery for the subsequent swap. This integrated approach ensures minimal downtime and maximizes the efficiency of each battery exchange.

In some embodiments, the battery swapping mechanism is designed for scalability, enabling multiple battery swap lift towers in a single facility. Such an arrangement ensures the continuous availability of pre-charged batteries, reducing wait times and bolstering the overall efficiency of the system. For instance, a facility might house four towers, each with 12 batteries, enabling a series of rapid battery swaps with minimal intervals between swaps.

In some embodiments, while the invention's applicability spans various EV designs, it demonstrates particular utility with SUV-pickup vehicles. An additional feature includes a detachable rear top of the SUV, enabling transformation into a Pickup, thus amplifying the vehicle's versatility.

In some embodiments, there are provisions to extend the inventive principle to other larger vehicles, such as electric semis and electric aircraft. The chassis-frames of these vehicles, both in longitudinal and horizontal orientations, are designed first for structural robustness. Simultaneously, they accommodate the insertion of battery containers directly through the main load-bearing structures, ensuring both operational efficiency and structural integrity.

In summary, the present invention harmoniously integrates a series of innovative design choices and mechanisms, revolutionizing the battery swap process for electric vehicles. Through its thoughtful combination of a modified chassis, efficient lifts, and scalable infrastructure, it paves the way for a new era of quick, efficient, and reliable battery replacements, addressing long-standing challenges in the EV industry.

BRIEF DESCRIPTION OF THE DRAWINGS

Various embodiments of the invention are disclosed in the following detailed description and accompanying drawings.

Figure 1A:
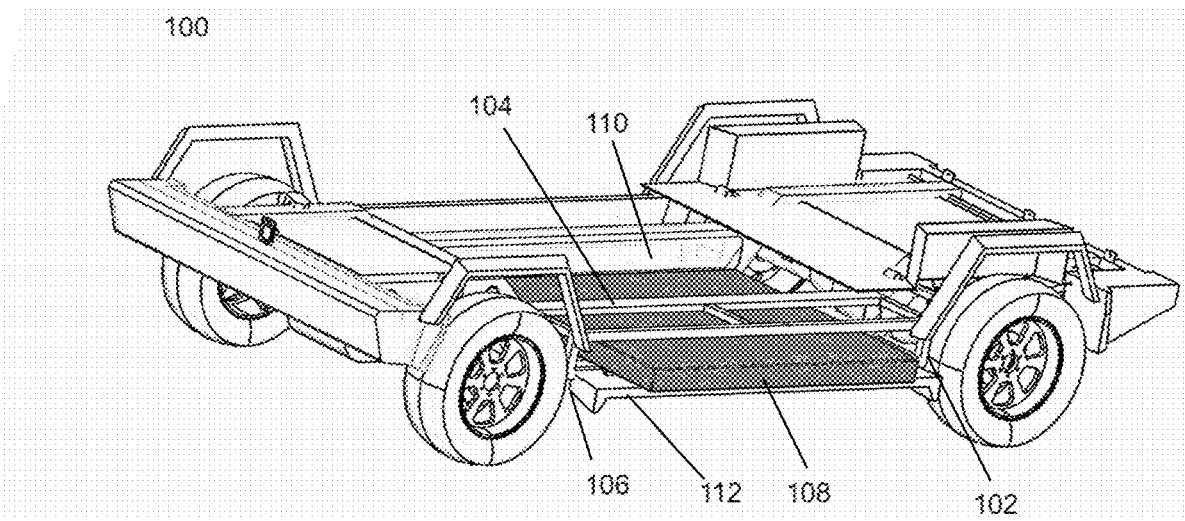
FIG. 1A presents a top isometric view of a modified vehicle chassis, showing a battery container being inserted through its side compartment.

Common reference numerals are used throughout the figures and the detailed description to indicate like elements. One skilled in the art will readily recognize that the above figures are examples and that other architectures, modes of operation, orders of operation, and elements/functions can be provided and implemented without departing from the characteristics and features of the invention, as set forth in the claims.

DETAILED DESCRIPTION AND PREFERRED EMBODIMENT

The following is a detailed description of exemplary embodiments to illustrate the principles of the invention. The embodiments are provided to illustrate aspects of the invention, but the invention is not limited to any embodiment. The scope of the invention encompasses numerous alternatives, modifications and equivalent; it is limited only by the claims.

Numerous specific details are set forth in the following description in order to provide a thorough understanding of the invention. However, the invention may be practiced according to the claims without some or all of these specific details. For the purpose of clarity, technical material that is known in the technical fields related to the invention has not been described in detail so that the invention is not unnecessarily obscured.

Definitions

The terminology used herein is for the purpose of describing particular embodiments only and is not intended to be limiting of the invention.

As used herein, the term "and/or" includes any combinations of one or more of the associated listed items.

As used herein, the singular forms "a," "an," and "the" are intended to include the plural forms as well as the singular forms, unless the context clearly indicates otherwise.

It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof.

The terminology used herein is for the purpose of describing particular embodiments only and is not intended to be limiting.

The terms "first," "second," and the like are used herein to describe various features or elements, but these features or elements should not be limited by these terms. These terms are only used to distinguish one feature or element from another feature or element. Thus, a first feature or element discussed below could be termed a second feature or element, and similarly, a second feature or element discussed below could be termed a first feature or element without departing from the teachings of the present disclosure.

DESCRIPTION OF DRAWINGS

The present invention relates generally to electric vehicles and, more particularly, to a modified electric vehicle chassis designed for rapid and efficient battery swapping. The described chassis design incorporates a unique set of structural and functional features aimed at addressing the present challenges facing electric vehicle battery replacement processes. These challenges have traditionally encompassed prolonged waiting times, inefficient battery removal and replacement mechanisms, and design limitations related to the vehicle's structure and weight-bearing capacity.

The electric vehicle chassis, as described herein, employs a pair of bifurcated load-bearing beams. Each beam is uniquely crafted with an upper section and a lower section separated to form a gap, ensuring the chassis retains its structural integrity while accommodating the desired functionalities. This arrangement allows for the horizontal placement and movement of a battery container, optimizing the balance and distribution of weight in the vehicle. Importantly, this configuration significantly simplifies and expedites the battery swapping procedure, reducing vehicle downtime and offering a more user-friendly experience.

Adjacent to these bifurcated beams is a battery compartment, strategically situated between the upper and lower sections. This compartment is devised to snugly and securely house the battery container. In certain embodiments, a side panel can be incorporated, which provides access to the battery compartment. This side panel is advantageously positioned around the vehicle's center of gravity to ensure stability during battery replacement operations. The inclusion of this feature exemplifies the thoughtful design considerations applied to achieve both functional and safety goals.

Further complementing the chassis structure is a heavy-duty chain and sprocket powered roller system, located within the battery compartment. This roller mechanism aids in the smooth and effortless movement of the battery container, whether inserting a freshly charged battery or extracting a spent one. The integration of this roller system highlights the importance of ease-of-use and efficiency, reducing the physical strain on the operator and further speeding up the battery swap process.

In coordination with the modified electric vehicle chassis, the invention also provides a double front battery swap lift. This lift, equipped with a dual-tray system featuring sprocket powered rollers, can hold two battery containers simultaneously. It vertically aligns with the vehicle's battery compartment, ensuring precise placement and removal of batteries. The lift's integration with a charging tower, equipped with multiple shelves for battery storage, facilitates a continuous swapping mechanism, further reducing the downtime typically associated with battery replacements.

Referring now to FIG. 1A, a first isometric perspective view of the modified vehicle chassis 100 is depicted, showcasing its novel structural and functional attributes. The vehicle is portrayed from above, giving a clear view of the bifurcated load-bearing beams 102, which are a defining feature of the invention. As can be observed, these beams 102 incorporate a distinct upper section 104 and a lower section 106, with a gap separating the two, allowing for a battery container 108 to move horizontally. This innovative design, as shown, ensures the chassis 100 retains its robust structural integrity while simultaneously accommodating the rapid battery swapping functionalities, a combination that enhances the vehicle's operational efficiency.

Positioned adjacent to the bifurcated beams 102 is a battery compartment 110, which is ingeniously situated between the upper section 104 and the lower section 106 of the beams. The purposefully designed gap within the beams 102 allows for the horizontal placement and movement of the battery container 108, optimizing the vehicle's balance and weight distribution during the battery replacement process. In this view, the side compartment 112 of the vehicle is clearly open, emphasizing ease of access to the battery compartment 110. The battery container 108 is shown in the midst of being inserted into the compartment 110, symbolizing the smoothness and efficiency of the battery swapping procedure, features which stand as testament to the invention's user-centric design.

Figure 1B:
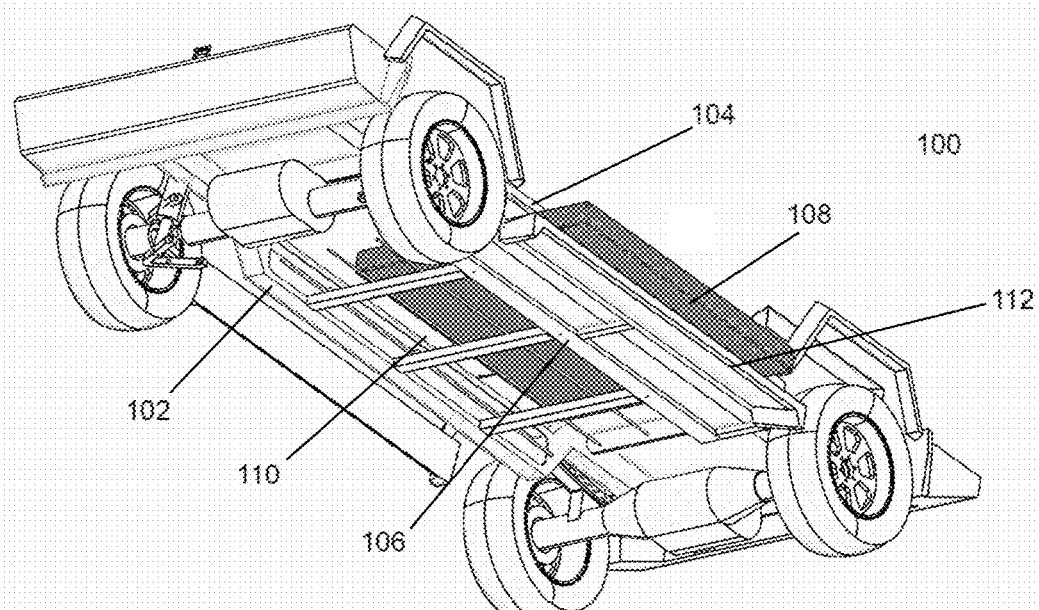
FIG. 1B provides a bottom isometric perspective of the scenario depicted in FIG. 1A.

Turning to FIG. 1B, a second isometric perspective of the modified vehicle chassis 100 is provided, this time from below, offering a comprehensive view of the underside components. Through this angle, the intricate design of the lower section 106 of the bifurcated beams 102 becomes more pronounced. Observers can appreciate the depth of engineering that went into ensuring the beams 102 can securely support the battery container 108, all the while maintaining the vehicle's overall structural stability.

Figure 2:
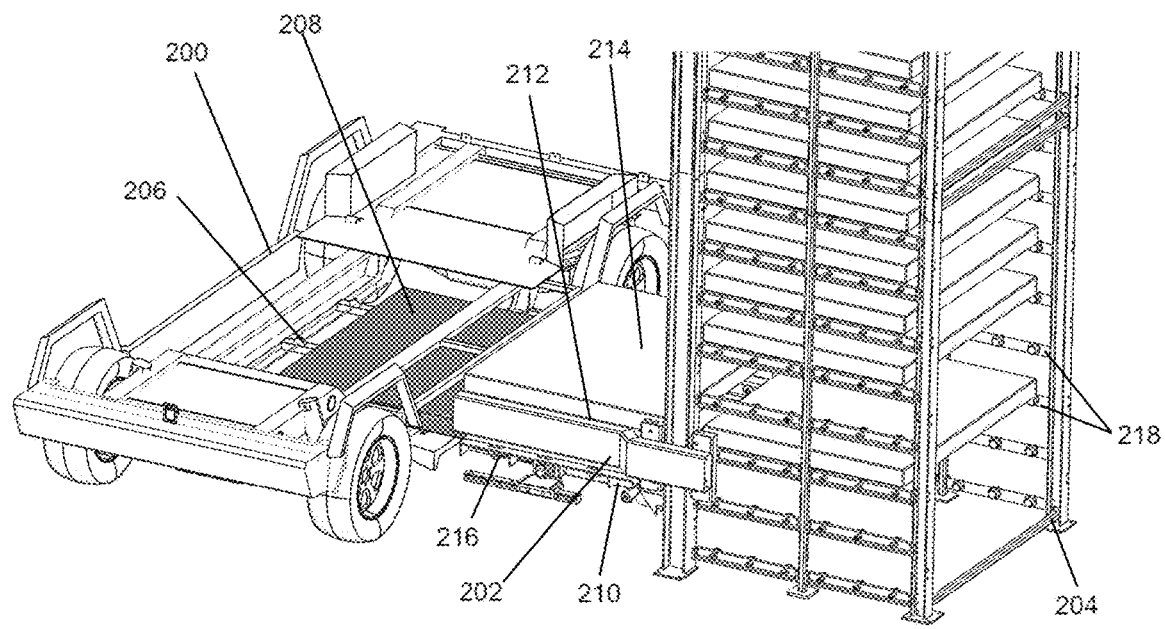
FIG. 2 illustrates the vehicle chassis and battery container in conjunction with a vehicle battery swap lift and charging tower.

Referring to FIG. 2, an integrated depiction of the vehicle chassis 200 interacting with a uniquely structured battery swap lift 202 and an accompanying battery charging tower 204 is presented. The depiction captures the synergy between these components, illustrating a streamlined process for battery swapping, one of the core functionalities this invention aims to improve.

The vehicle chassis 200, which carries design principles observed in FIG. 1A and FIG. 1B, notably incorporates a sprocket and roller mechanism 206 embedded within the floor of its chamber. This mechanism 206 is currently engaged in the activity of facilitating the horizontal movement of a battery container 208. Drawing from the principles of mechanical design, this mechanism 206 ensures that the battery container 208 is transitioned with minimal friction and maximal accuracy, ensuring optimal positioning during the swapping process.

Below the vehicle chassis 200, the battery swap lift 202 is prominently positioned. This lift 202 comprises a lower tray 210 and an upper tray 212. The former is designed to receive the spent battery container 208 from the vehicle chassis 200, whereas the latter is already equipped with a fully charged battery container 214, poised and ready for the next phase of the swapping operation. The transfer of battery containers between the vehicle chassis 200 and the battery swap lift 202 is facilitated by the sprocket and roller mechanism 216 present on the lift. This mechanism 216 mirrors the functionalities of its counterpart in the vehicle chassis 200, enabling the harmonized and smooth transition of the battery containers 208, 214 between the two structures.

Supporting the battery swap lift 202 is the battery charging tower 204. Designed as a multi-tiered vertical storage system, the tower 204 comprises multiple shelves 218 configured to hold battery containers in various states of charge. One particular shelf, located at the bottom, remains empty, waiting to accommodate the spent battery container 208 extracted from the vehicle. The design ensures that there is a systematic flow of battery containers through the charging tower 204, with designated spaces for containers that are charging, ready for use, or spent. This ensures maximum utilization of space and enhances the overall efficiency of the battery management system.

Together these FIGS. 3A-3E show the three movement process that the battery lift goes through when swapping a spent vehicle battery container for a new fully charged one.

Figure 3A:
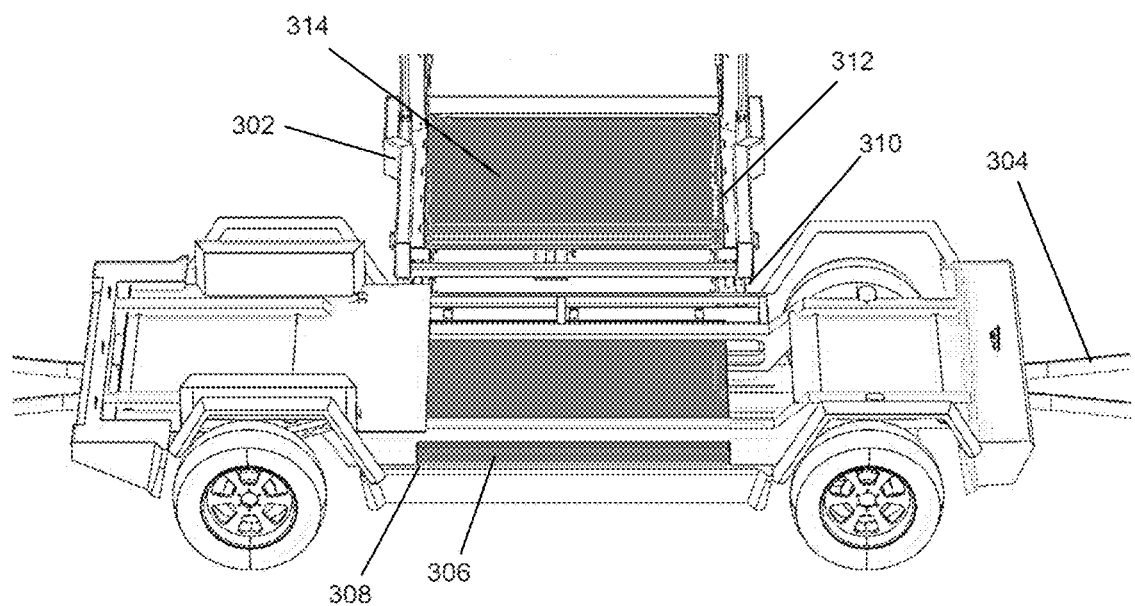
FIG. 3A to FIG. 3E collectively display the three-step movement process of the battery swap lift during a battery exchange.

In reference to FIG. 3A, the vehicle is strategically situated in proximity to the battery swap lift 302. The positioning is not arbitrary but is facilitated by a set of guiding tracks 304, ensuring the vehicle aligns perfectly with the lift 302. This precision is paramount as it guarantees a flawless interaction between the two systems. At this stage, the vehicle retains the spent battery 306, securely enclosed within its chassis chamber 308. Simultaneously, the lower tray 310 of the battery swap lift 302 is optimally positioned to align with the open vehicle chamber side compartment, which is an initiation point for the battery swapping operation.

Figure 3B:
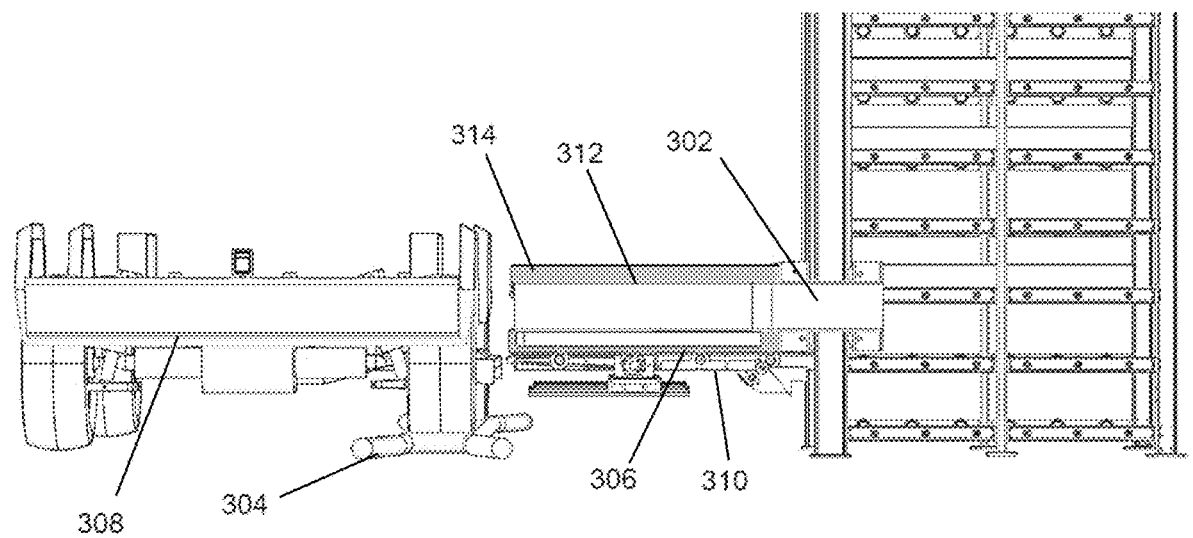

Moving to FIG. 3B, a clear progression in the battery swapping process is observed. The spent battery 306 is now seen transitioning horizontally from the vehicle chamber 308. With the assistance of the vehicle's embedded roller mechanism, the battery 306 is rolled smoothly onto the lower tray 310 of the lift 302. It remains in this position for the duration of the subsequent steps.

Figure 3C:
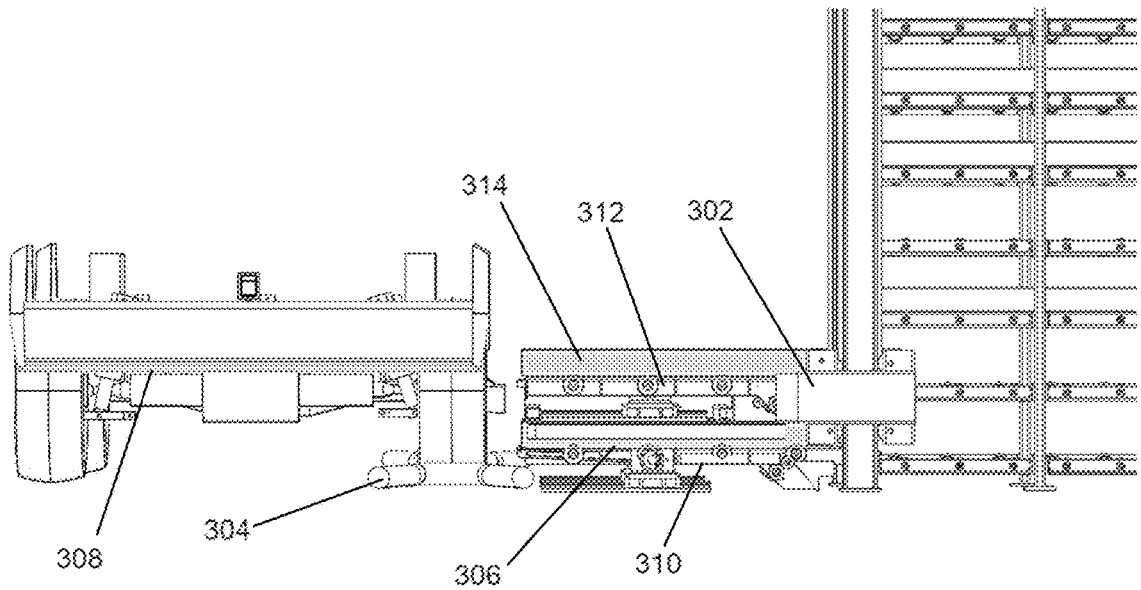

FIG. 3C advances this process further. With the spent battery 306 securely placed on the lower tray 310, the battery swap lift 302 initiates its vertical movement. The primary objective here is to position the upper tray 312, holding the fully charged battery 314, in direct alignment with the open chamber 308 of the vehicle. This alignment ensures that the swapping procedure is executed with impeccable accuracy, reducing the possibility of misalignment or mechanical errors.

Figure 3D:
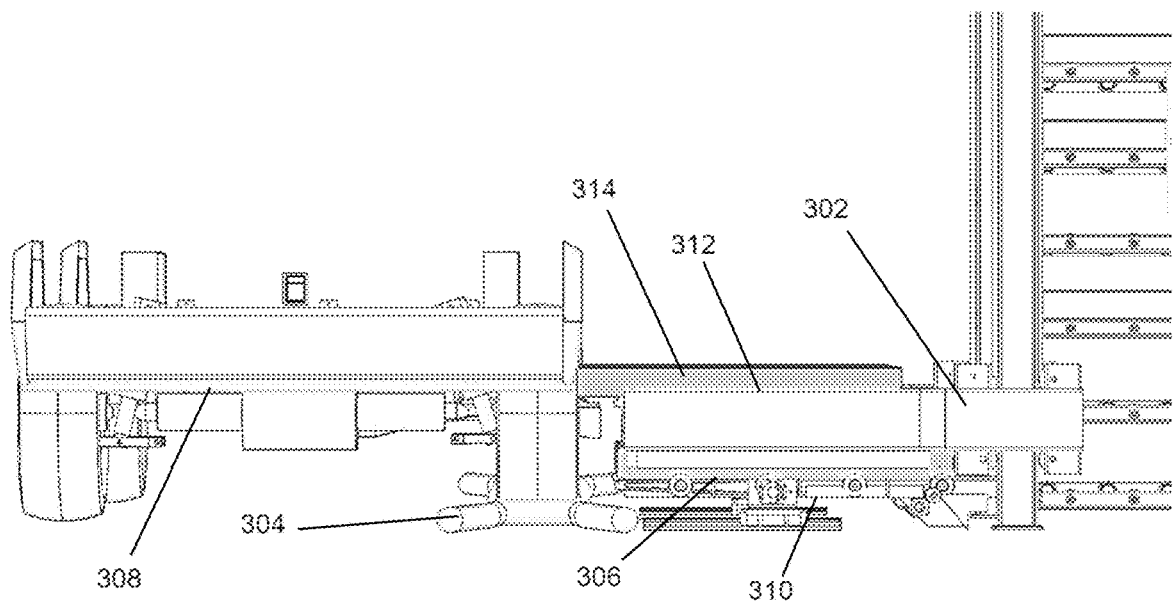

In FIG. 3D, the culmination of the prior setups is observed. The upper tray 312, powered by its roller mechanism, begins to transfer the fully charged battery 314 horizontally into the vehicle's chamber 308. This movement is not only facilitated by the tray's roller mechanism but is also synchronized with the vehicle's own internal rollers, ensuring that the battery 314 is transitioned without hitches.

Figure 3E:
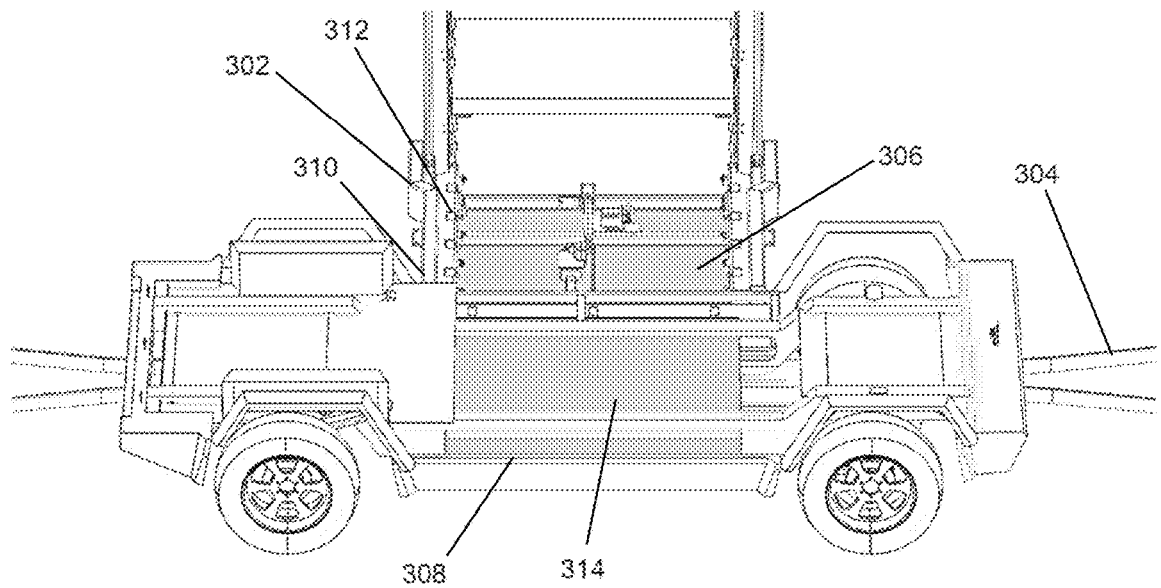

FIG. 3E depicts the completion of the battery swapping process. The vehicle chamber 308 now houses the new fully charged battery 314. The change in the battery swap lift 302 is also evident—the lower tray 310 now contains the spent battery 306, while the upper tray 312 remains unoccupied, indicating a successful swap.

Together FIG. 4A-FIG. 4F show the five movement process the battery lift goes through in depositing a spent battery into the charging tower, acquiring a fully charged battery, and moving into position ready for the next vehicle battery swap.

Figure 4A:
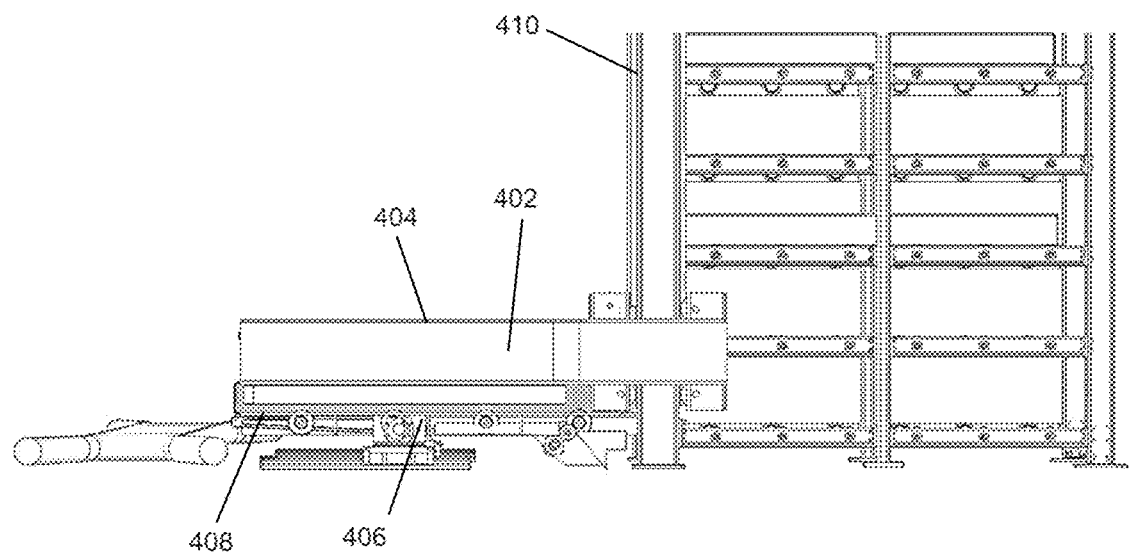
FIG. 4A to FIG. 4F depict the five-stage movement process the battery lift undergoes post-battery swap, emphasizing the interaction with the charging tower.

Referring to FIG. 4A, we see the battery swap lift 402, immediately post a successful battery exchange procedure. The lift's upper tray 404 is noticeably empty, having already deposited its fully charged battery into the vehicle in a preceding operation. In stark contrast, the lower tray 406 bears the weight of a spent battery container 408, indicative of a recent battery swapping process.

Figure 4B:
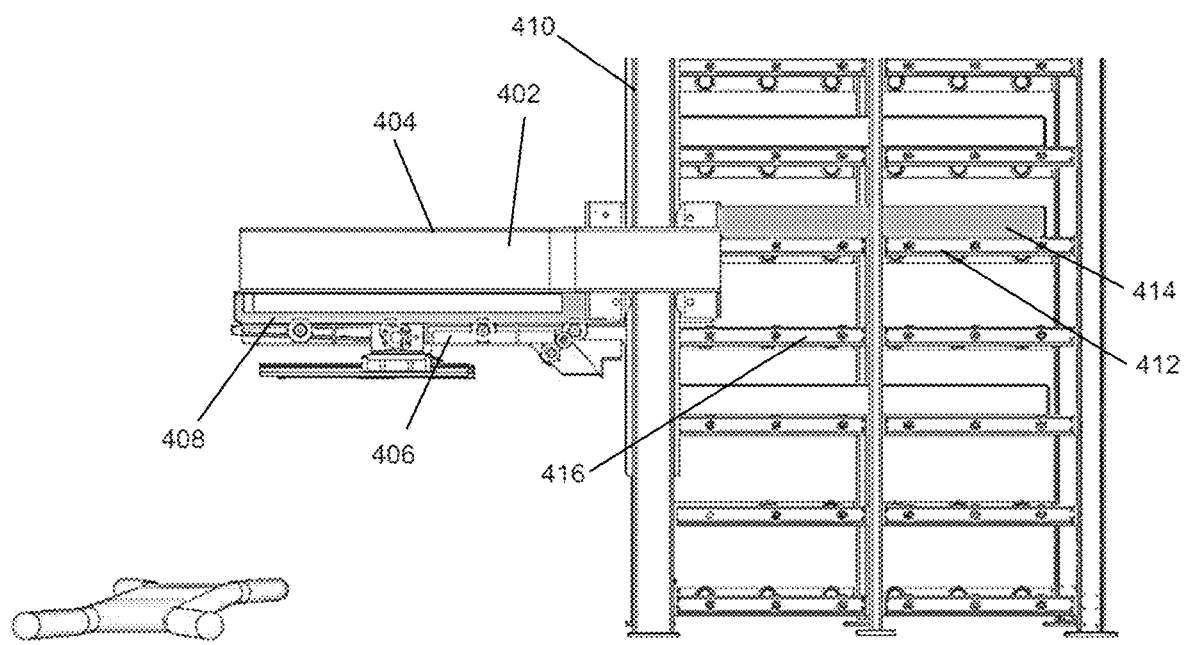

As the narrative progresses to FIG. 4B, a substantial vertical movement of the battery swap lift 402 is observed along the guide rails of the battery charging tower 410 to which it is affixed. Such movement has been orchestrated to ensure that the upper tray 404 of the lift is precisely aligned with a charging shelf 412. This shelf currently houses a fully charged battery 414, primed for a swap. Concurrently, the lower tray 406, holding the spent battery 408, is aligned with an empty charging shelf 416, designed to receive and charge spent batteries.

Figure 4C:
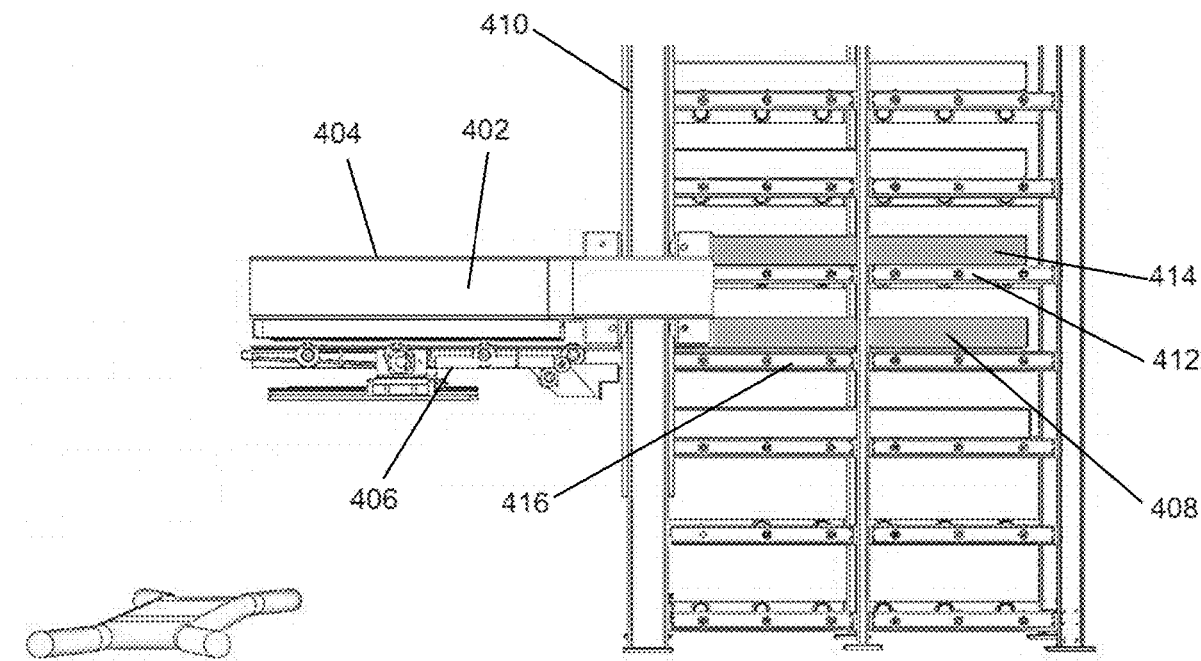

Transitioning to FIG. 4C, the lift 402 initiates its battery deposition sequence. Using its integrated sprocket-powered rollers, the lift efficiently moves the spent battery container 408 from the lower tray 406 to the vacant charging shelf 416. This ensures the battery is safely placed in a position to initiate its recharging cycle, leveraging the shelf's charging infrastructure.

Figure 4D:
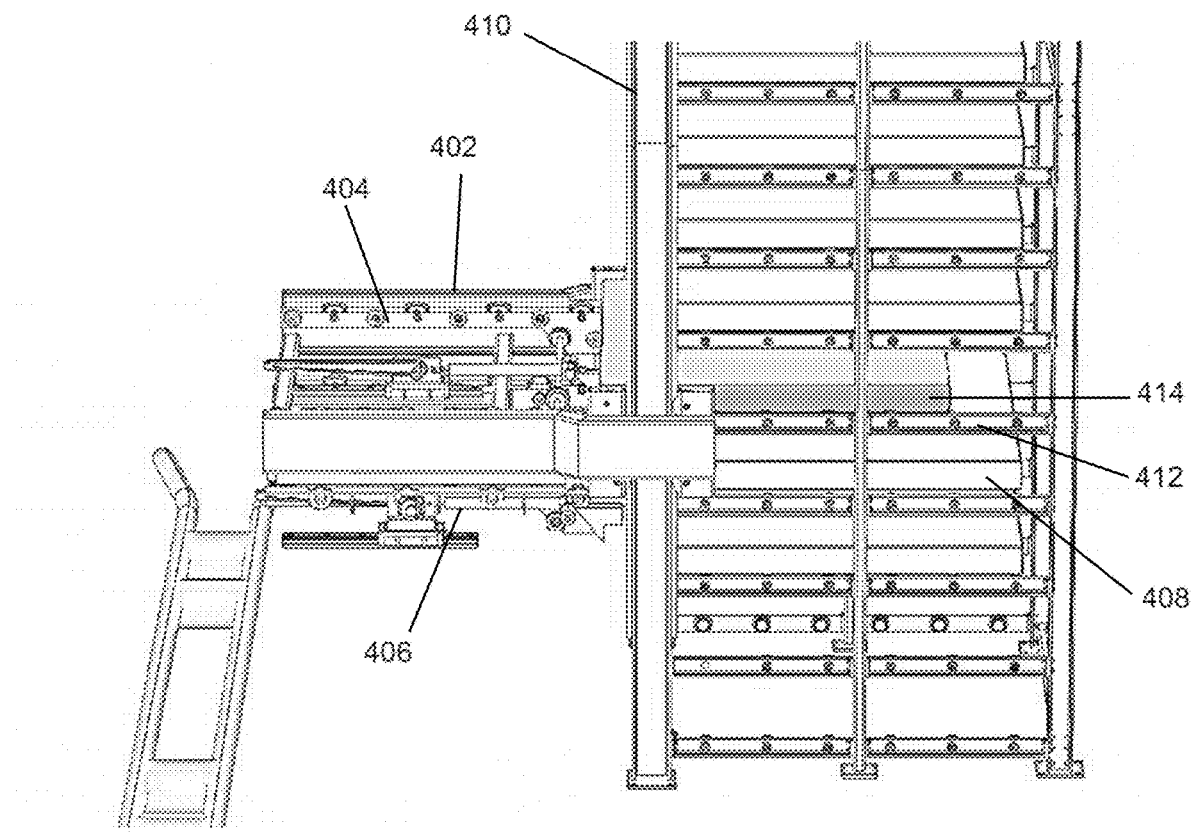

In FIG. 4D, a continuation of the battery swapping procedure is depicted. The charging shelf's sprocket-powered rollers engage to transfer the fully charged battery 414 from its resting position on the shelf to the waiting upper tray 404 of the lift 402. This movement ensures that the lift is equipped with a fully charged battery, prepared for its imminent engagement with the next vehicle.

Figure 4E:
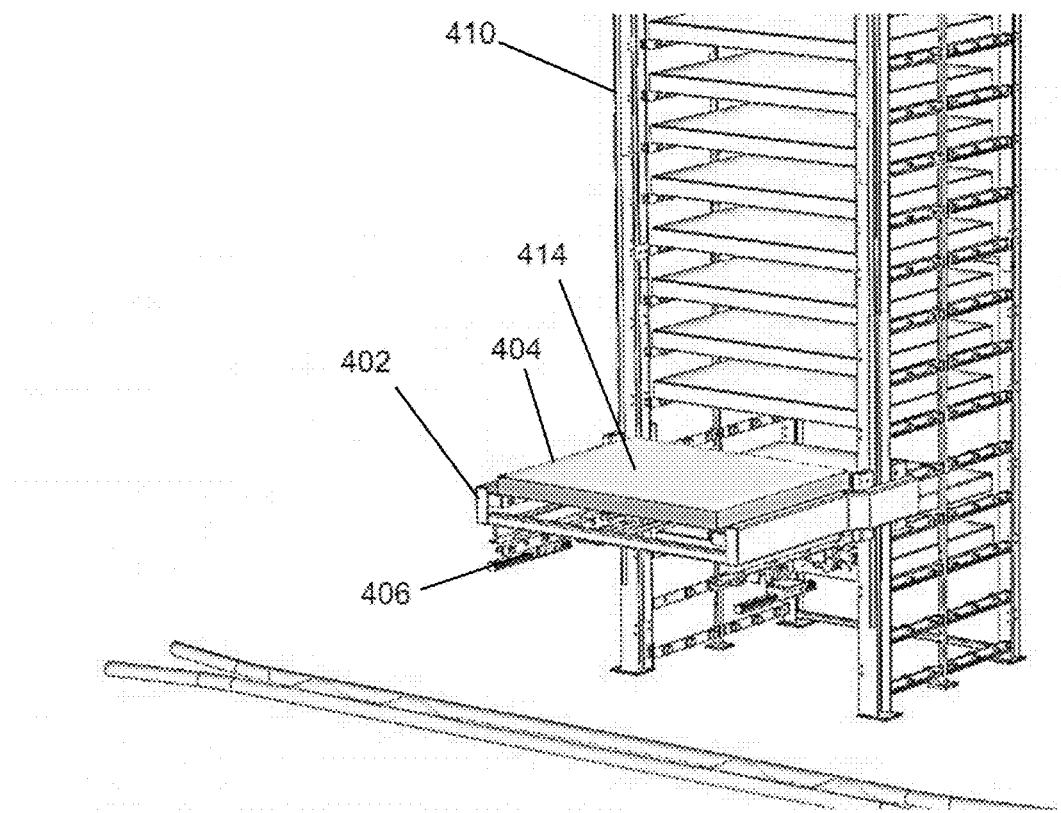

FIG. 4E illustrates the lift 402 initiating a descending motion away from the charging shelves. This vertical movement, facilitated by the lift's operational mechanics, ensures the system returns to its starting position, primed and ready for its next interaction.

Figure 4F:
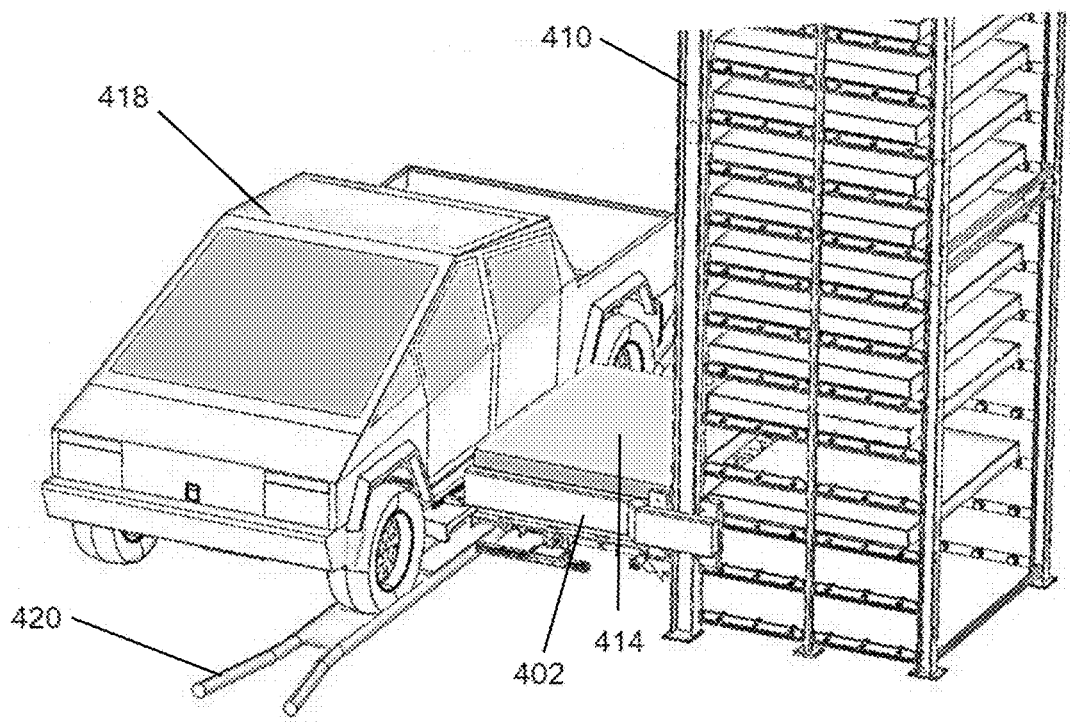

Lastly, FIG. 4F introduces a new vehicle 418 approaching the battery swap lift 402. The vehicle navigates the tracks 420, leading it to its destined position, adjacent to the lift. The side compartment of the vehicle, designed to house the battery, is meticulously aligned with the now vacant lower tray 406 of the lift, signifying readiness for the forthcoming battery exchange.

Figure 5:
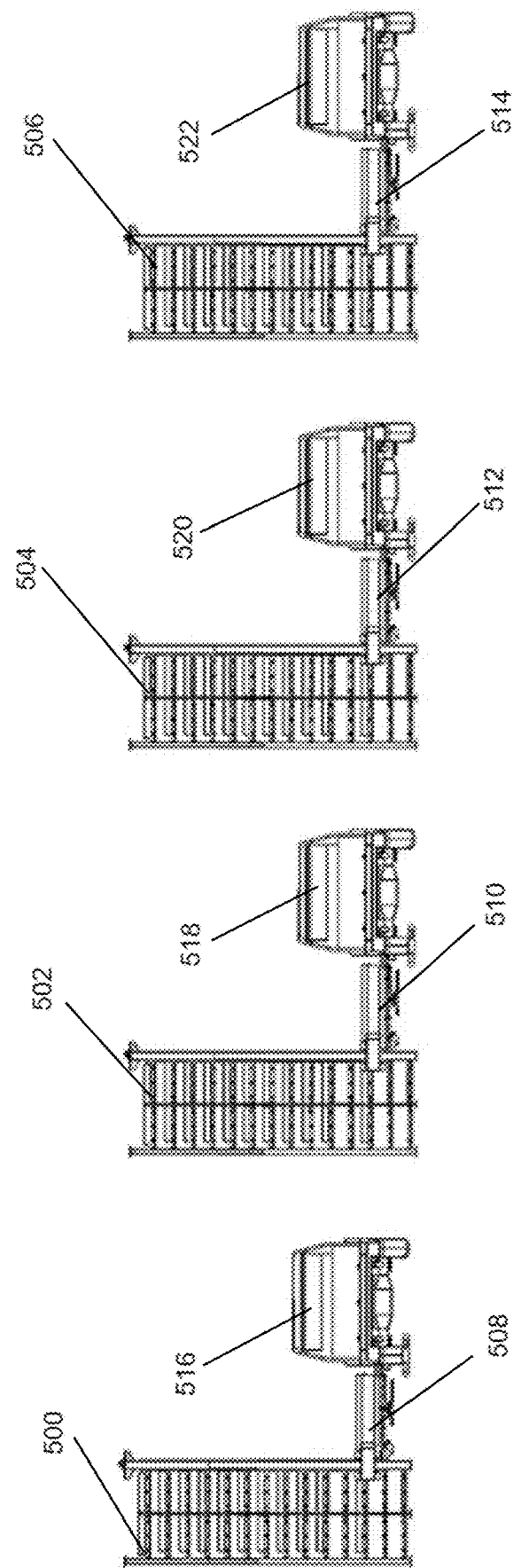
FIG. 5 showcases a networked layout of multiple charging towers and their corresponding lifts, emphasizing scalability and simultaneous operations.

Referring to FIG. 5, a panorama of advanced vehicular energy replenishment unfolds. At the forefront is an assembly of four distinct charging towers, each designated by reference numerals 500, 502, 504, and 506. These towers, while similar in function, operate concurrently, attending to four separate vehicles in various stages of the battery swapping procedure, illustrating the versatile adaptability of the infrastructure.

Adjacent to each charging tower is a corresponding battery swap lift, denoted by reference numerals 508, 510, 512, and 514. Each of these lifts is in various stages of operational readiness and engagement.

The vehicles, positioned adjacent to these lifts and being serviced, are marked by numerals 516, 518, 520, and 522. Each vehicle, although functionally similar, is seen in varied orientations vis-a-vis the battery swap lifts, underscoring the dynamic interaction between vehicles and the swapping infrastructure.

Looking beyond the immediate operational framework, the panoramic view in FIG. 5 projects a vision of scalability. The arrangement of charging towers and associated lifts exemplifies a modular design. This modularity suggests that the charging station could effortlessly be expanded, incorporating more towers and lifts, thereby forming a vast network catering to an increasing number of electric vehicles. Such a scalable design approach not only addresses the present demands of electric vehicle charging but also forecasts and readies for future vehicular influxes.

Examples of Further Specific Implementations

Energy Source and Mechanism for Sprocket Powered Rollers:

Energy Source: The sprocket powered rollers could utilize direct current (DC) electric motors powered by the main electric grid. These motors are optimal for their torque characteristics, offering high torque at low speeds, which would be essential for the precise and swift movements required in the battery swap process.

Mechanism: Each roller would be directly linked to a motor-driven sprocket. The roller's rotation is controlled by the motor's direction and speed. A centralized control system, perhaps using a PLC (Programmable Logic Controller), would regulate the precise timing, speed, and direction of the roller rotations, ensuring smooth, synchronized movements during the battery swap process.

Modified Chassis:

Material: The chassis beams could be made from high-tensile strength steel or lightweight, durable alternatives like aluminum or carbon-fiber reinforced polymers to manage the weight of the heavy battery containers.

Safety Latches: Integrated safety latches or locking mechanisms ensure that the battery container stays securely in place during transit.

Sensors: Infrared or ultrasonic sensors might be incorporated to detect the correct alignment of the battery container during the insertion or removal process, providing real-time feedback to the battery swapping mechanism.

Left wheel guide: the guide track may include two specific wheel divots for the front and rear left wheels on the wheel guide track which are designed to cause the driver to park not only in the correct position longitudinally (x axis) but also position the vehicle in the exact correct position horizontally (y axis) to execute the battery swap.

Battery Swap Lift:

Stability: The base of the lift might be broadened or weighted to ensure stability, especially when handling heavy battery containers.

Telescopic Pillars: To achieve precise vertical movement, the lift can be built with telescopic pillars, ensuring smooth elevation or lowering.

Safety: A combination of optical and physical sensors will be used to detect any obstructions or misalignments during the battery swap process. The system could halt or adjust its movements based on this input.

Feedback System: The lift could be equipped with haptic or audible feedback mechanisms to signal the completion of the battery swap to the vehicle operator.

Charging Tower:

Modular Design: The tower might be designed modularly, allowing for easy expansion or modification as technology advances or as more storage capacity is needed.

Cooling System: Given the potential heat generated during charging, the tower could integrate a passive or active cooling system, possibly using fans or liquid-based cooling.

Safety Protocols: In case of electrical malfunctions, the tower should be equipped with built-in circuit breakers and fire suppression systems.

Battery Status Display: Each shelf or slot in the tower could have an LED display or indicator light showing the charge status of the battery (e.g., green for fully charged, red for charging, or blue for maintenance mode).

Automated Maintenance: The tower might integrate diagnostic tools to routinely check the health of the batteries. If a battery's health is suboptimal, it could be flagged for maintenance or replacement.

Dimensions: Given the battery container dimensions (6 ft×5 ft×7 in), each slot in the tower should be slightly larger, perhaps 6.5 ft×5.5 ft×8 in, allowing for a small clearance during insertion or removal.

The present invention offers a groundbreaking approach to expedite the battery swapping process for electric vehicles, addressing a long-standing challenge in the realm of electric mobility. The unique design of the split-load electric vehicle chassis, characterized by its bifurcated load-bearing beams, is pivotal in enhancing the efficiency and safety of battery swaps. This design not only streamlines the physical loading and unloading of heavy battery containers but also ensures that the batteries are situated at the vehicle's center of gravity, thereby maintaining vehicular stability and balance.

Coupled with the chassis, the double front battery lift system, equipped with sprocket powered rollers, streamlines the swapping procedure. Its ability to handle two battery containers simultaneously and the swift vertical movements bolster the efficiency of the process, reducing battery swap times to a mere fraction compared to existing systems. Moreover, the integration with a charging tower, consisting of multiple shelves with their roller mechanisms, ensures a seamless and automated swapping experience, promising high throughput in battery swap stations.

The tangible benefits of this invention are manifold. For the end user, it translates to significantly reduced waiting times, ensuring electric vehicles can be back on the road almost instantaneously. For service providers, the efficiency gains can lead to a substantial increase in operational throughput, translating to higher profitability.

Additionally, the modular nature of this invention makes it versatile. While the initial focus may be on SUV-pickup vehicles, with features like the detachable rear top enhancing the vehicle's utility, the principles laid down in this invention can easily be extrapolated to larger vehicles such as electric semis and even electric aircraft. The foundational idea of batteries being loaded through the primary load-bearing structure remains consistent, promising a wide range of applications.

In the broader context, this invention not only accelerates the adoption of electric vehicles by addressing a significant pain point but also sets the stage for future innovations in this domain. The patent's detailed description underscores the meticulous design, the integration of systems, and the anticipated impact on electric mobility. Future iterations and applications of this invention can further revolutionize the landscape of electric transportation, driving us closer to a sustainable and efficient future.

Unless otherwise defined, all terms (including technical terms) used herein have the same meaning as commonly understood by one having ordinary skill in the art to which this invention belongs. It will be further understood that terms, such as those defined in commonly used dictionaries, should be interpreted as having a meaning that is consistent with their meaning in the context of the relevant art and the present disclosure and will not be interpreted in an idealized or overly formal sense unless expressly so defined herein.

The disclosed embodiments are illustrative, not restrictive. While specific configurations of the modified chassis and battery swap system have been described in a specific manner referring to the illustrated embodiments, it is understood that the present invention can be applied to a wide variety of solutions which fit within the scope and spirit of the claims. There are many alternative ways of implementing the invention.

It is to be understood that the embodiments of the invention herein described are merely illustrative of the application of the principles of the invention. Reference herein to details of the illustrated embodiments is not intended to limit the scope of the claims, which themselves recite those features regarded as essential to the invention.

What is claimed is:

1. An electric vehicle chassis comprising:
a pair of bifurcated load-bearing beams, each beam having an upper section and a lower section separated in the middle to form a gap;
a battery compartment positioned between said upper section and said lower section of said bifurcated load-bearing beams, said battery compartment configured to receive a battery container in a horizontal orientation; and
said battery compartment is located at the vehicle's center of gravity.

2. The electric vehicle chassis of claim 1, further comprising a side panel configured to open, allowing access to the battery compartment and facilitating the horizontal movement of the battery container into or out of said battery compartment.

3. The electric vehicle chassis of claim 2, wherein said side panel is located at a location at which the vehicle's mass is balanced and around which it rotates.

4. The electric vehicle chassis of claim 1, wherein the chassis is designed to support both the operational weight and forces of the vehicle and the weight of the battery container and to allow the battery container to be passed through the chassis at the vehicle's center of gravity.

5. The electric vehicle chassis of claim 1, further comprising heavy duty chain and sprocket powered rollers to facilitate movement of the battery container.

6. An electric vehicle battery swapping system comprising:
one or more electric vehicles as recited in claim 1;
a double front battery lift comprising an upper tray and a lower tray, each tray equipped with sprocket powered rollers;
means for vertically moving said double front battery lift such that a battery container on one tray is aligned with the battery compartment of said electric vehicle.

7. The electric vehicle battery swapping system of claim 6, wherein said double front battery lift is configured to simultaneously support two battery containers, one on the upper tray and another on the lower tray.

8. The electric vehicle battery swapping system of claim 6, further comprising a chamber within said electric vehicle chassis with its own set of sprocket powered rollers, facilitating the movement of the battery container into or out of said battery compartment.

9. The electric vehicle battery swapping system of claim 6, further comprising a battery swap lift tower, wherein said tower comprises vertical supports and said double front battery lift is mounted to said vertical supports.

10. The electric vehicle battery swapping system of claim 9, wherein said tower comprises multiple shelves configured to store battery containers, and said double front battery lift is configured to transfer battery containers to and from said shelves.

11. The electric vehicle battery swapping system of claim 9, wherein multiple such battery swap lift towers are arranged within a facility, facilitating continuous battery swaps.

12. The electric vehicle battery swapping system of claim 6, further comprising a mechanism to move the battery containers in coordination with the sprocket powered rollers, including means for ejecting a spent battery from said chamber onto one tray of the double front battery lift and means for introducing a charged battery from another tray into said chamber.

13. The electric vehicle chassis of claim 1, further configured for transformation into a pickup, wherein a rear top of the vehicle is detachable.

14. The electric vehicle chassis of claim 1, wherein said chassis is designed to support both the operational weight and forces of the vehicle and the weight of the battery containers passed through the bifurcated load-bearing beams.

15. An electric vehicle battery swapping system as recited in claim 1, further comprising a vehicle guide track configured to align said vehicle with said battery compartment, and said vehicle guide track includes wheel divots for the front and rear wheels to align the vehicle in the correct position longitudinally and horizontally for the battery swap.

\* \* \* \* \*